(12) United States Patent
Shim

(10) Patent No.: US 6,700,436 B2
(45) Date of Patent: Mar. 2, 2004

(54) METHOD AND CIRCUIT FOR GENERATING A HIGH VOLTAGE

(75) Inventor: Jae-Yoon Shim, Gyeonggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 10/246,036

(22) Filed: Sep. 17, 2002

(65) Prior Publication Data

US 2003/0076156 A1 Apr. 24, 2003

(30) Foreign Application Priority Data

Oct. 23, 2001 (KR) .................................. 2001-0065522

(51) Int. Cl.$^7$ .............................................. G05F 1/10
(52) U.S. Cl. ....................................................... 327/536
(58) Field of Search ................................ 327/530, 534, 327/535, 536, 537

(56) References Cited

U.S. PATENT DOCUMENTS 5,907,484 A * 5/1999 Kowshik et al. ............... 363/60
6,452,438 B1 * 9/2002 Li ................................ 327/536

* cited by examiner

Primary Examiner—Jeffrey Zweizig
(74) Attorney, Agent, or Firm—Marger Johnson & McCollom, P.C.

(57) ABSTRACT

A high voltage generating circuit is described that includes, a control signal generating circuit for generating a first control signal in a first time period, and for generating second, third and fourth control signals in second, third and fourth time periods in this order; first, second and third pre-charge circuit for pre-charging first, second and third nodes in response to the first control signal; first and second step-up and charge transferring circuits for stepping up the first and third nodes in response to the second control signal and for performing a charge sharing operation between the first and second nodes and between the third and fourth nodes; a third step-up and charge transferring circuit for stepping up the second node in response to the third control signal and for performing a charge sharing operation between the second and fourth nodes; a pre-charge and charge supplying circuit for pre-charging the fourth node and for supplying charges to the fourth node; and a fourth step-up and charge transferring means for stepping up the fourth node in response to the fourth control signal and for transferring charges of the fourth node to a high voltage generating terminal.

29 Claims, 10 Drawing Sheets

METHOD AND CIRCUIT FOR GENERATING A HIGH VOLTAGE

This application claims priority from Korean Priority Document No. 2001-65522, filed on Oct. 23, 2001, which is hereby incorporated by reference in its entirety.

BACKGROUND OF THE INVENTION

1. Technical Field

This disclosure relates to a high voltage generating circuit, and more particularly, to a high voltage generating circuit for a semiconductor memory device.

2. Background

A high voltage generating circuit for a semiconductor memory device generally generates a high voltage this is higher than a power voltage that is externally provided. The high voltage generating circuit is used to transfer a signal having a power voltage level without causing a threshold voltage loss when a high voltage generated therefrom is applied to a gate of an NMOS transistor that is a component of circuits such as a word line driver, a bit line isolation circuit, or a data output buffer.

A memory cell of a conventional dynamic semiconductor memory device includes a capacitor for storing a data and an NMOS transistor that turns on in response to a signal applied to a word line to transfer data between a bit line and the capacitor. However, the NMOS transistor has a disadvantage in that a threshold voltage loss occurs when a signal having a power voltage level is transferred. Hence, a high voltage is applied to the word line in response to an active command in order to transfer data without causing a threshold voltage loss.

FIG. 1 is a circuit diagram illustrating a conventional high voltage generating circuit. The high voltage generating circuit of FIG. 1 includes a pulse signal generating circuit 10, NMOS transistors N1, and N2-1 to N2-n, and CMOS capacitors C11 to C1n.

The pulse signal generating circuit 10 repeatedly generates pulse signals P1 and P2 which have a phase opposite to each other. Each of the capacitors C11 to C1n steps up nodes n1 to nn in response to the pulse signals P1 and P2. The NMOS transistor N1 is diode connected and transfers a voltage VDD-VT to the node n1. The NMOS transistors N2-1 to N2-n transfer voltages of the nodes n1 to nn to the nodes n2 to nn and a high voltage generating terminal in response to voltages applied to the nodes n1 to nn, respectively.

Operation of the high voltage generating circuit of FIG. 1 is described with reference to a timing diagram of FIG. 2.

The node n1 is pre-charged to a voltage level VDD-VT. Here, the voltage VT represents a threshold voltage level of the NMOS transistor N1.

During a time period T1, the odd nodes n1 and n(n-1) are boosted to a voltage level VDD-VT in response to the pulse signal P1 having a logic "high" level. The boosted voltage is transferred to the even nodes n2 and nn through the NMOS transistors N2-1 to N2-(n-1). The even nodes n2 and nn become pumped to a voltage level 2 VDD-2 VT.

During a time period T2, the even nodes n2 and nn are boosted to a voltage level 3 VDD-2 VT. The boosted voltage is transferred to the nodes n3 (not shown) to n(n-1) and the high voltage generating terminal through the NMOS transistors N2-2 to N2-n. The nodes n3 to n(n-1) and the high voltage generating terminal become a voltage level 3 VDD-3 VT.

However, the high voltage generating circuit of FIG. 1 has to experience an n-number of stages so as to boost a high voltage VPP. Therefore, power consumption is increased, and the high voltage cannot be generated fast within a desired time.

FIG. 3 is a schematic view illustrating another conventional high voltage generating circuit. The high voltage generating circuit of FIG. 3 includes a control signal generating circuit 20, pre-charge circuits 22 and 24, capacitors C2 and C3, level shifters 26 and 28, and NMOS transistors N3 and N4.

The high voltage generating circuit of FIG. 3 shows a configuration illustrating a two-stage step-up circuit having a pre-charge circuit.

The control signal generating circuit 20 generates a pulse signal P3 having a phase opposite to an active command ACT, and generates pulse signals P4 and P5 which have a phase opposite to each other when the active command ACT having a logic "high" level is applied. The pre-charge circuits 22 and 24 pre-charge nodes A and B in response to the pulse signal P3, respectively. The capacitors C2 and C3 step up the nodes A and B in response to the pulse signals P4 and P5, respectively. The NMOS transistors N3 and N4 are turned on in response to output signals of the level shifters 26 and 28 to transfer voltages of the nodes A and B.

Operation of the high voltage generating circuit of FIG. 3 is described with reference to a timing diagram of FIG. 4.

During a time period T3, when the active command ACT having a logic "low" level is applied, the pulse signal P3 having a logic "high" level is generated from the control signal generating circuit 20. The pre-charge circuits 22 and 24 pre-charge the nodes A and B to a voltage level VDD when the pulse signal P3 having a logic "high" level is generated.

During a time period T4, when the active command ACT having a logic "high" level is applied, the control signal generating circuit 20 generates the pulse signal P4 having a logic "high" level. When the pulse signal P4 having a logic "high" level is generated, a voltage of the node A is boosted to a voltage level 2 VDD by the capacitor C2. The level shifter 26 shifts a voltage level of the pulse signal P4 from a power voltage (VDD) level to a high voltage level. The NMOS transistor N3 is turned on in response to the high voltage level. As a result, a charge sharing operation is performed between the nodes A and B so that the voltages of the nodes A and B become a voltage level 1.5 VDD.

During a time period T5, the pulse signal P4 having a logic "low" level and the pulse signal P5 having a logic "high" level are generated from the control signal generating circuit 20. When the pulse signal P5 having a logic "high" level is generated, a voltage of the node B is boosted to a voltage level 2.5 VDD by the capacitor C3. The level shifter 28 shifts a voltage level of the pulse signal P5 from the power voltage level to the high voltage level. The NMOS transistor N4 is turned on in response to the high voltage level. As a result, the charge sharing operation is performed between the node B and the high voltage generating terminal so that a level of the high voltage is boosted.

The high voltage generating circuit of FIG. 3 can boost a voltage of the node B, which is a voltage-boosting node, to a voltage level 2.5 VDD. That is, the high voltage generating circuit of FIG. 3 can boost a voltage of the voltage-boosting node higher than that of FIG. 1 and is faster in voltage-boosting timing than that of FIG. 1.

The high voltage generating circuit of FIG. 3 has no problem when the power voltage is high. However, as a level of a power voltage VDD of the semiconductor memory device is decreased due to lower power level requirements, a level of the high voltage VPP is decreased. Therefore, since the decreasing of the power voltage VDD is greater than the decreasing of the high voltage VPP, it is not easy to generate a high voltage VPP having a desired level by the high voltage generating circuit of FIG. 3.

SUMMARY OF THE INVENTION

Embodiments of the present invention provide a high voltage generating circuit and method which can quickly boost the high voltage to a desired level even though a level of a power voltage is lowered.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION

Reference will now be made in detail to preferred embodiments of the present invention, example of which is illustrated in the accompanying drawings.

Figure 5:
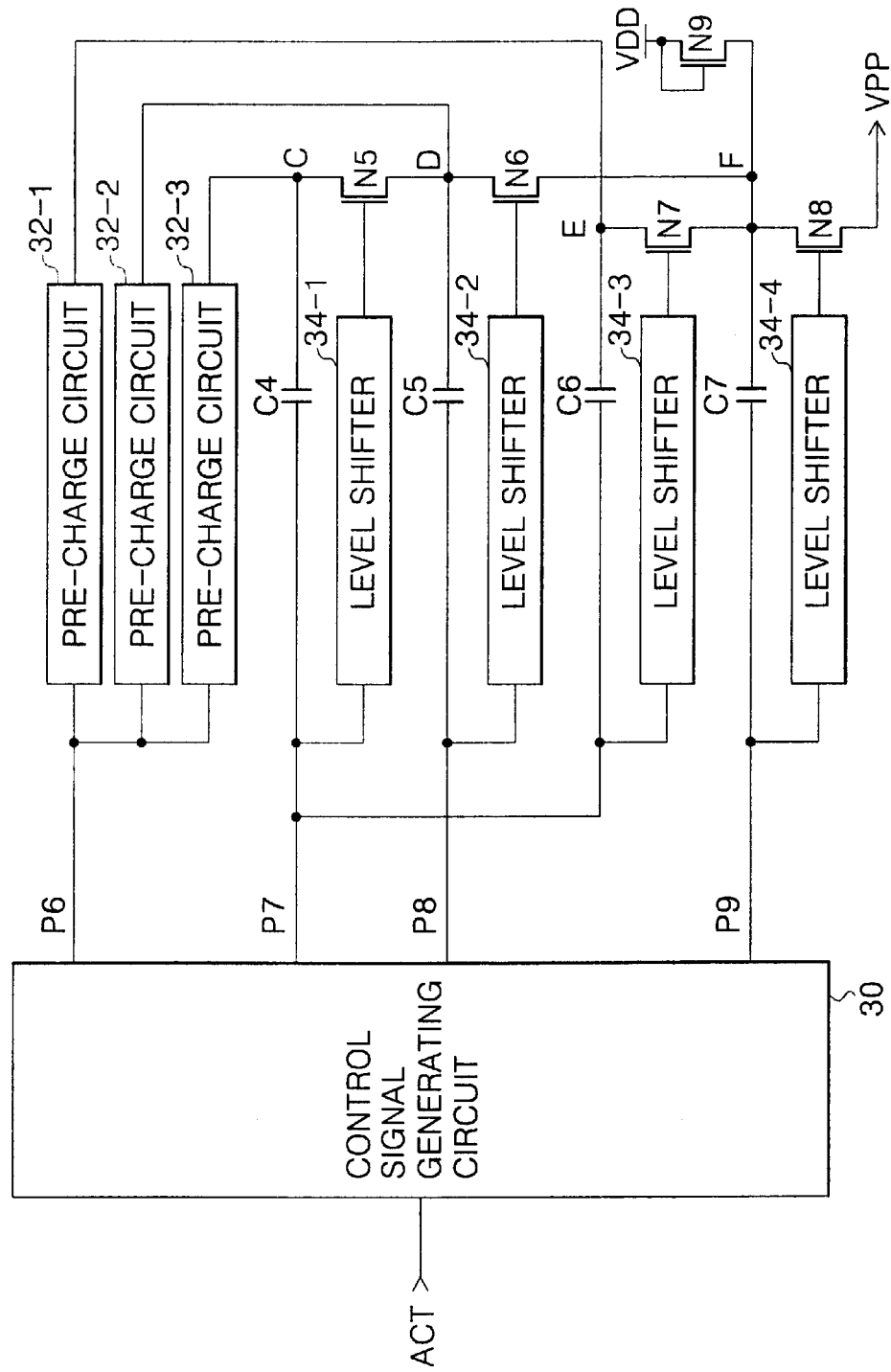
FIG. 5 is a schematic view illustrating a high voltage generating circuit according to an embodiment of the present invention.

FIG. 5 is a schematic view illustrating a high voltage generating circuit according to an embodiment of the present invention. The high voltage generating circuit includes a control signal generating circuit 30, pre-charge circuits 32-1 to 32-3, capacitors C4 to C7, level shifters 34-1 to 34-4, and NMOS transistors N5 to N9.

The control signal generating circuit 30 generates a pulse signal P6 having a phase opposite to a phase of an active command ACT, and generates pulse signals P7 to P9 having a logic "high" level in different phase while the active command ACT having a logic "high" level is applied. The pre-charge circuits 32-1 to 32-3 pre-charge nodes C to E to a voltage level VDD in response to the pulse signal P6 having a logic "high" level, respectively. The NMOS transistor N9 pre-charges a node F to a voltage level VDD−VT at the initial stage, and makes the node F become a level of a high voltage VPP by the pulse signal P9 having a logic "high" level. Here, the voltage VT represents a threshold voltage of the NMOS transistor N9. Thereafter, the pulse signal P9 transits to a logic "low" level, the node F goes to a voltage level VPP-VDD. That is, the NMOS transistor N8 is turned on to step up the high voltage VPP, and then a voltage of the node F is lowered to a voltage level VPP−VDD. Here, when a voltage level VPP-VDD of the node F is lower than a voltage level VDD, a charge loss of the node F is compensated. The capacitors C4 and C6 step up the nodes C and E to a voltage level 2 VDD in response to the pulse signal P7 having a logic "high" level. The capacitor C5 steps up the node D to a voltage level 2 VDD in response to the pulse signal P8 having a logic "high" level. The capacitor C7 steps up the node F to a voltage level 2 VDD in response to the pulse signal P9 having a logic "high" level. The level shifters 34-1 and 34-3 shift a voltage level of the pulse signal P7 from a voltage level VDD having a logic "high" level to a voltage level VPP. The level shifter 34-2 shifts a voltage level of the pulse signal P8 from a voltage level VDD having a logic "high" level to a high voltage level VPP. The NMOS transistor N5 is turned on in response to a high voltage level VPP output from the level shifter 34-1 to make a charge sharing operation be formed between the nodes C and D. The NMOS transistor N6 is turned on in response to a high voltage level VPP output from the level shifter 34-2 to make a charge sharing operation be formed between the nodes D and F. The NMOS transistor N7 is turned on in response to a high voltage level VPP output from the level shifter 34-3 to make a charge sharing operation be formed between the nodes E and F.

The NMOS transistor N8 is turned on in response to a high voltage level VPP output from the level shifter 34-4. Charges of the node F are transferred to a high voltage generating terminal to step-up the high voltage VPP.

Operation of the high voltage generating circuit of FIG. 5 is described with reference to a timing diagram of FIG. 6.

When the active command ACT is applied, the control signal generating circuit 30 generates the pulse signal having a phase opposite to a phase of the active command ACT. When the active command having a logic "high" level is applied, the pulse signal P7 having a power voltage level VDD, the pulse signal P8 having a power voltage level VDD, and the pulse signal P9 having a power voltage level VDD are generated in time periods T7, T8, and T9, respectively, in this order.

When the active command ACT having a logic "low" level is applied in a time period T6 after the operation is repeatedly performed by several times to tens of times, the pulse signal P6 having a logic "high" level is generated from the control signal generating circuit 30. Thus, the pre-charge circuits 32-1 to 32-3 operate to pre-charge the nodes C, D and E and make the node F become a voltage level VPP−VDD.

When the pulse signal P7 of a power voltage level VDD having a logic "high" level is generated in the time period T7, the node C is stepped up to a voltage level 2 VDD by the capacitor C4. The level shifter 34-1 shifts a voltage level of the pulse signal P7 from the power voltage level VDD to a high voltage level VPP. Thus, the NMOS transistor N5 is turned on so that the charge sharing operation is performed between the nodes C and D. As a result, a voltage level of the nodes C and D go to a voltage level 1.5 VDD. The node E is stepped up to a voltage level 2 VDD by the capacitor C6. The level shifter 34-3 shifts a voltage level of the pulse signal P7 from a power voltage level VDD to a high voltage level VPP. The NMOS transistor N7 is turned on so that the charge sharing operation is performed between the nodes E and F. As a result, the nodes E and F become a voltage level 0.5 VPP+0.5 VDD.

When the pulse signal P8 of a power voltage level VDD having a logic "high" level is generated in the time period T8, the nodes D and E are stepped up to a voltage level 2.5 VDD by the capacitor C5. The level shifter 34-2 shifts a voltage level of the pulse signal P8 from the power voltage VDD to a high voltage level VPP. The NMOS transistor N6 is turned on so that the charge sharing operation is performed between the nodes D and F. As a result, the nodes D and F become a voltage level 0.25 VPP+1.5 VDD.

When the pulse signal P9 of a power voltage level VDD having a logic "high" level is generated in the time period T9, the node F is stepped up to a voltage level 0.25 VPP+2.5 VDD by the capacitor C7. The level shifter 34-4 shifts a voltage level of the pulse signal P9 from the power voltage VDD to a high voltage level VPP. The NMOS transistor N8 is turned on so that charges of the node F are transferred to a high voltage generating terminal to thereby generate a high voltage VPP.

The high voltage VPP is generated by repeatedly performing the above-described operation.

Figure 1:
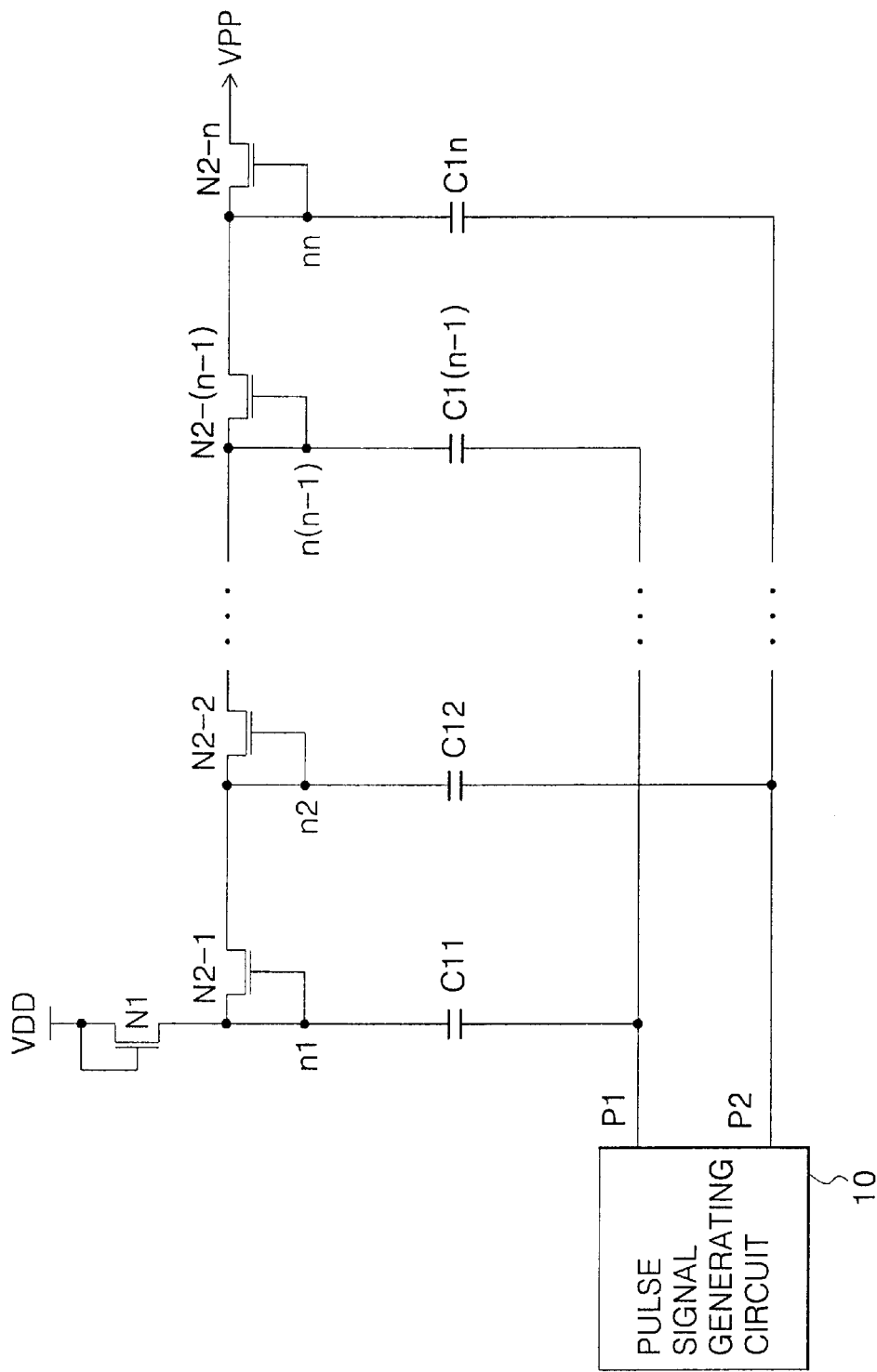
FIG. 1 is a circuit diagram illustrating a conventional high voltage generating circuit.
Figure 2:
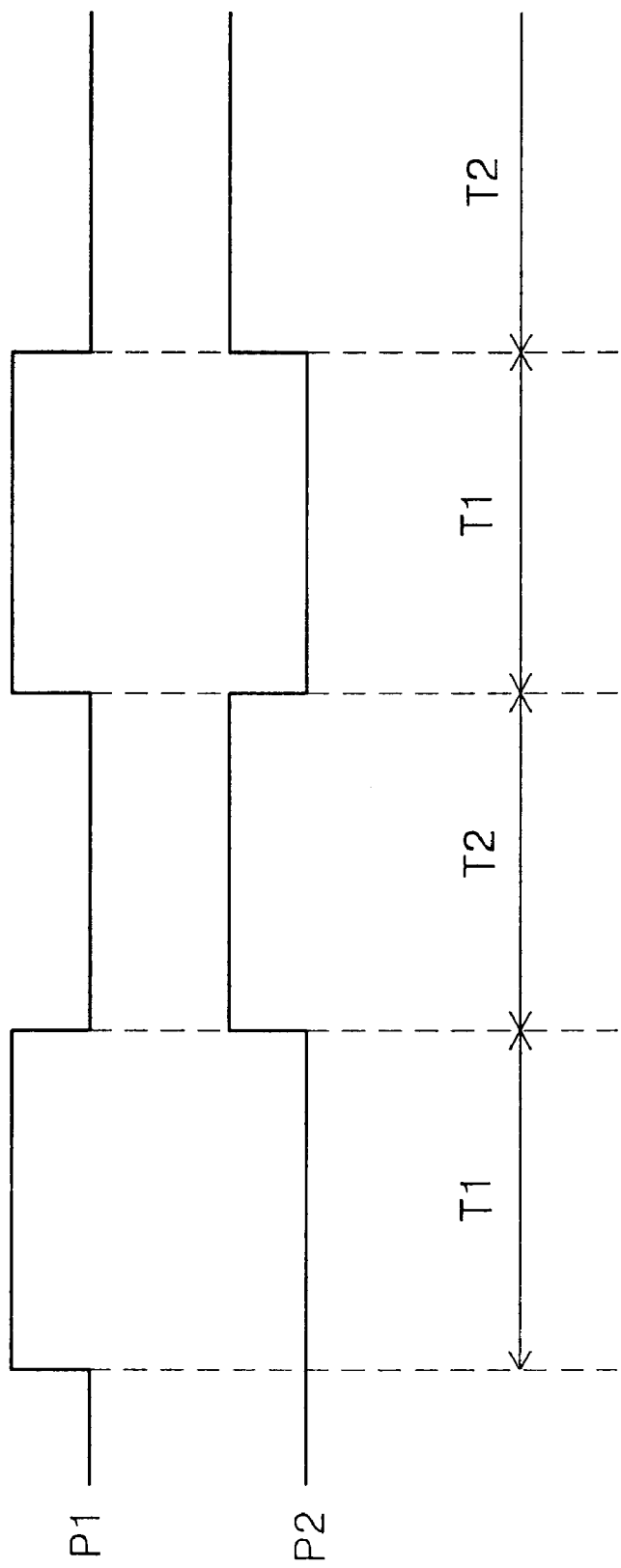
FIG. 2 is a timing diagram illustrating an operation of the high voltage generating circuit of FIG. 1.
Figure 3:
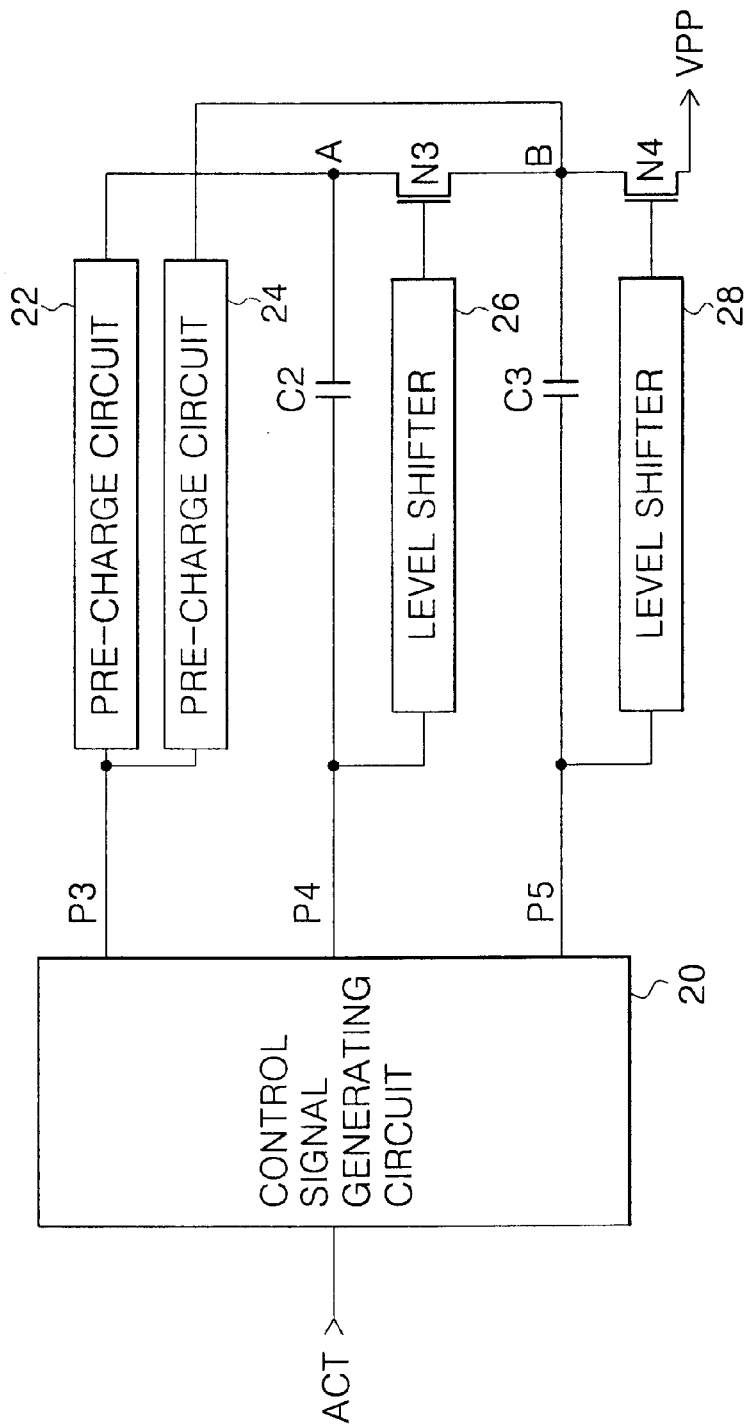
FIG. 3 is a schematic view illustrating another conventional high voltage generating circuit.
Figure 4:
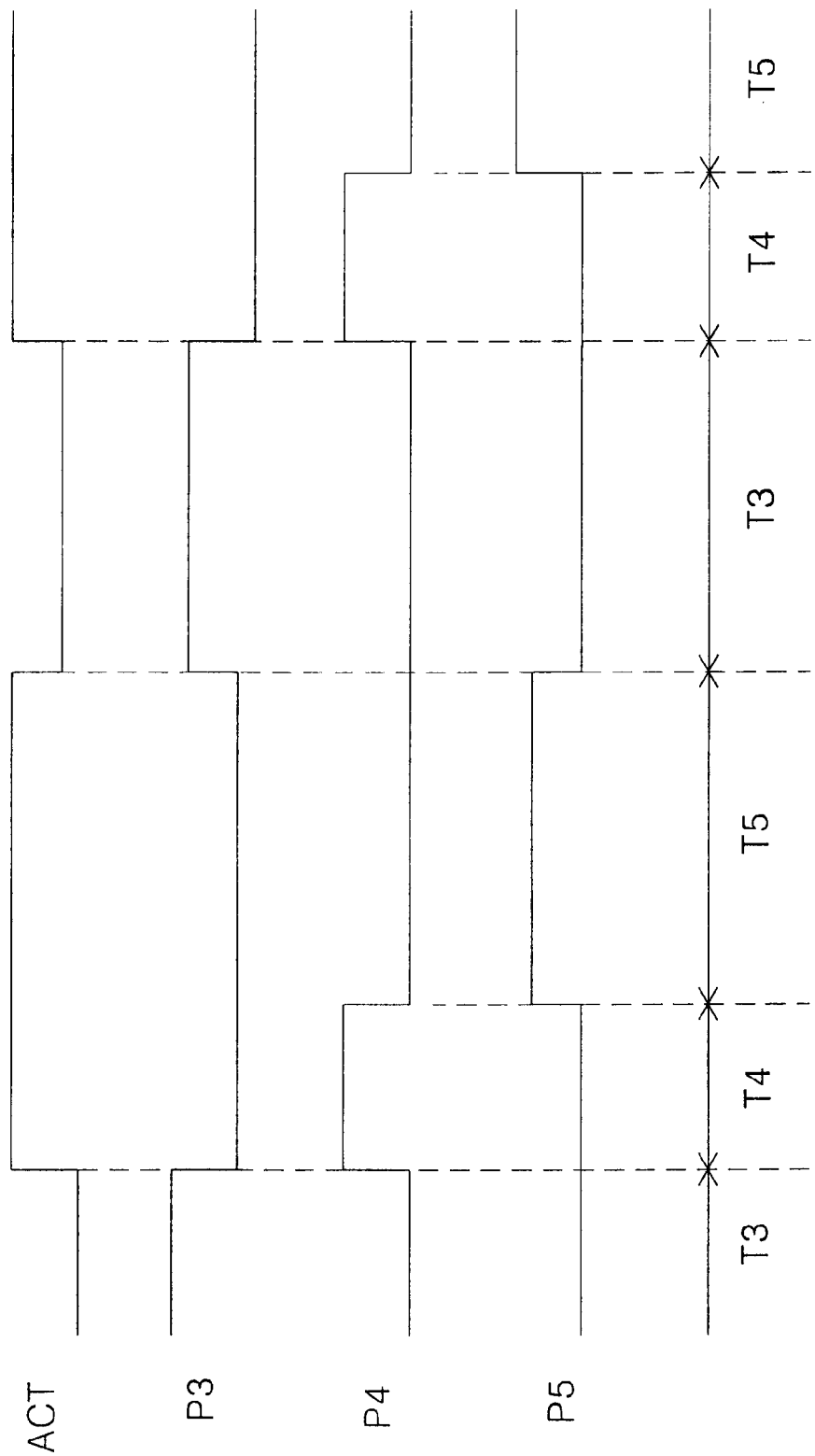
FIG. 4 is a timing diagram illustrating an operation of the high voltage generating circuit of FIG. 3.

The high voltage generating circuit of FIG. 5 can step up a high voltage level VPP to a desired voltage level by stepping up a voltage level of the node F to a voltage level 0.25 VPP+2.5 VDD even though a power voltage level VDD is lowered. That is, the conventional high voltage generating circuit of FIG. 3 steps up the voltage-boosting node to a voltage level 2.5 VDD, whereas the high voltage generating circuit of FIG. 5 can boost the voltage-boosting node to a voltage level 0.25 VPP+2.5 VDD.

Figure 7:
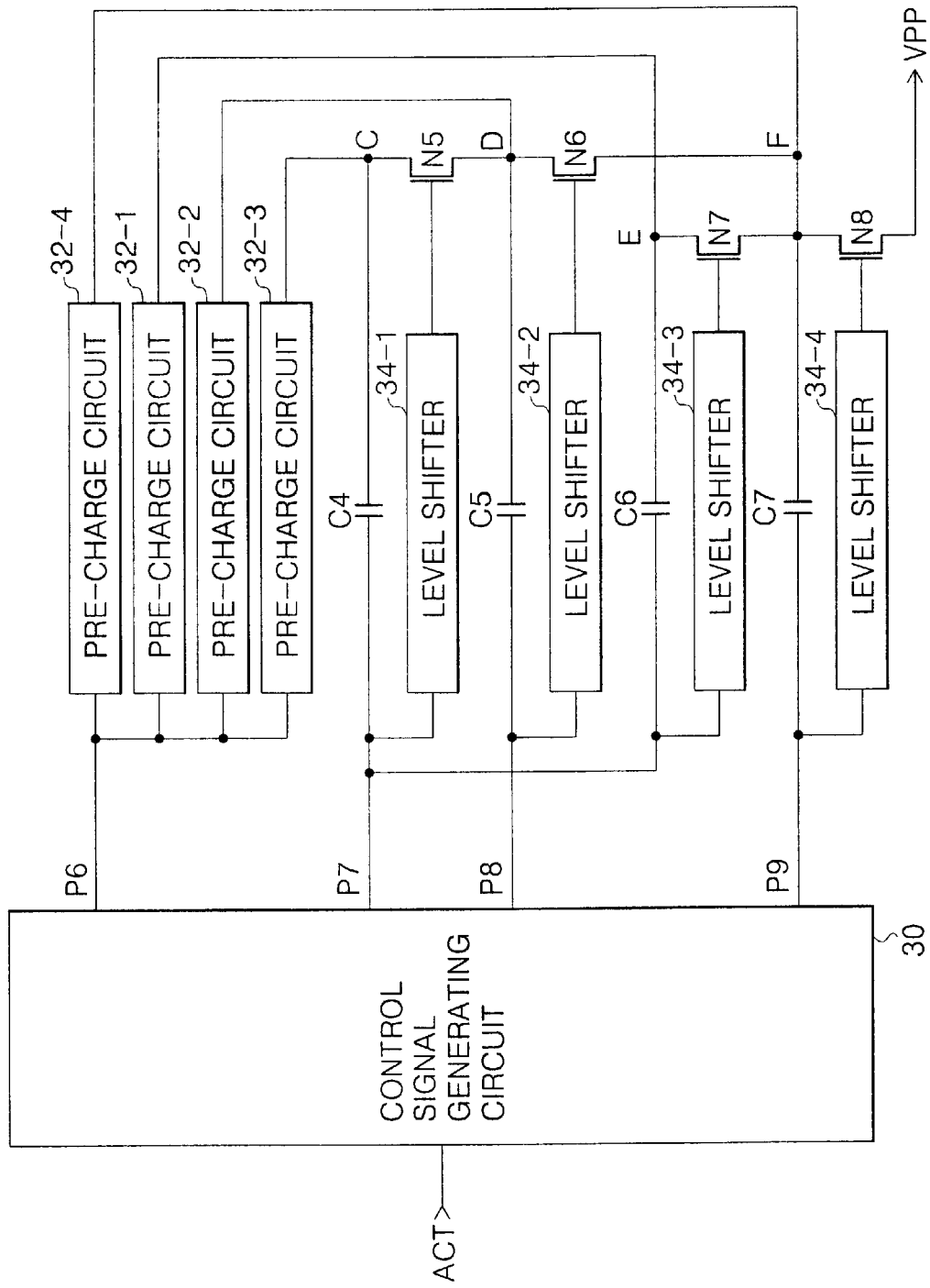
FIG. 7 is a circuit diagram illustrating a high voltage generating circuit according to another embodiment of the present invention.

FIG. 7 is a circuit diagram illustrating a high voltage generating circuit according to another embodiment of the present invention. The high voltage generating circuit of FIG. 7 is configured such that a pre-charge circuit 32-4 is added to and the NMOS transistor N9 is removed from a circuit configuration of the high voltage generating circuit of FIG. 5.

The pre-charge circuit 32-4 serves to pre-charge the node F at the time when the nodes C, D and E are pre-charged.

Like reference numerals of FIGS. 5 and 7 denote like parts. Operation of the high voltage generating circuit of FIG. 7 is described with reference to a timing diagram of FIG. 8.

Figure 6:
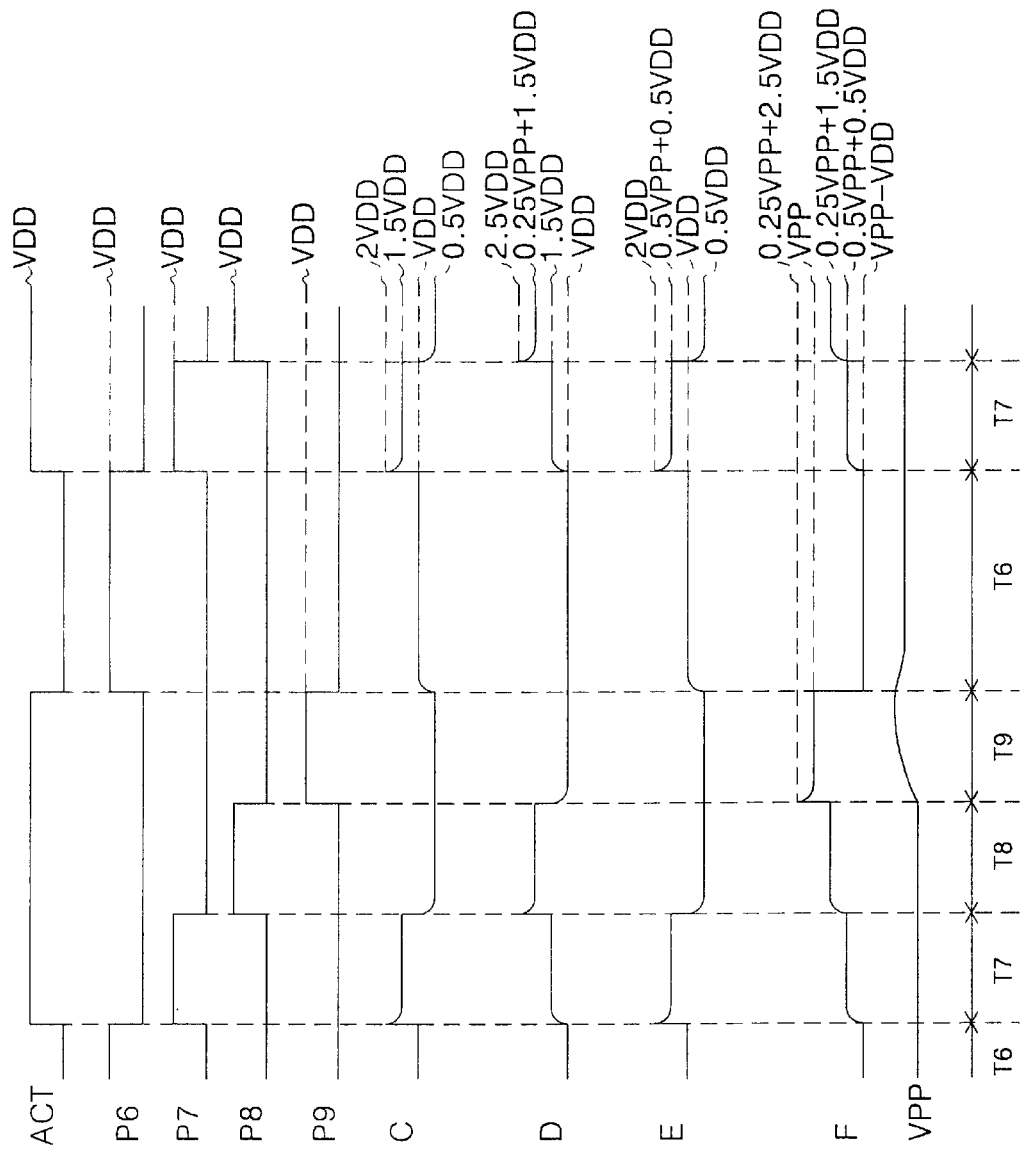
FIG. 6 is a timing diagram illustrating an operation of the high voltage generating circuit of FIG. 5.
Figure 8:
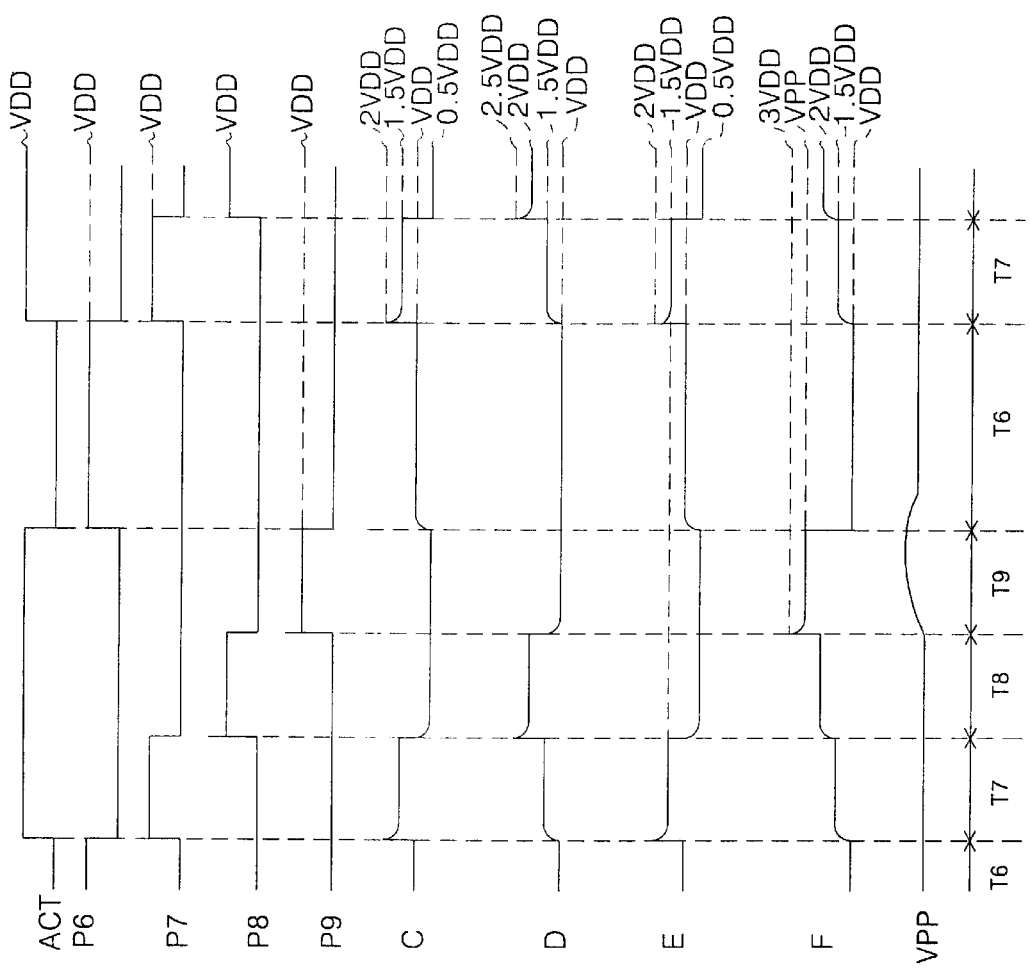
FIG. 8 is a timing diagram illustrating an operation of the high voltage generating circuit of FIG. 7.

Pulse signals P6 to P9 of FIG. 8 are generated in the same way as those of FIG. 6. When the active command ACT having a logic "low" level is applied in a time period T6, the control signal generating circuit 30 generates the pulse signal P6 having a logic "high" level so that the pre-charge circuits 32-1 to 32-4 pre-charge the nodes C to F.

When the pulse signal P7 of a power voltage level VDD having a logic "high" level is generated in the time period T7, the node C is stepped up to a voltage level 2 VDD by the capacitor C4. The level shifter 34-1 shifts a voltage level of the pulse signal P7 from the power voltage level VDD to a high voltage level VPP. Thus, the NMOS transistor N5 is turned on so that the charge sharing operation is performed between the nodes C and D. As a result, a voltage level of the nodes C and D go to a voltage level 1.5 VDD. The node E is stepped up to a voltage level 2 VDD by the capacitor C6. The level shifter 34-3 shifts a voltage level of the pulse signal P7 from a power voltage level VDD to a high voltage level VPP. The NMOS transistor N7 is turned on so that the charge sharing operation is performed between the nodes E and F. As a result, the nodes E and F become a voltage level 1.5 VDD.

When the pulse signal P8 of a power voltage level VDD having a logic "high" level is generated in the time period T8, the nodes D and E are stepped up to a voltage level 2.5 VDD by the capacitor C5. The level shifter 34-2 shifts a voltage level of the pulse signal P8 from the power voltage VDD to a high voltage level VPP. The NMOS transistor N6 is turned on so that the charge sharing operation is performed between the nodes D and F. As a result, the nodes D and F become a voltage level 2 VDD.

When the pulse signal P9 of a power voltage level VDD having a logic "high" level is generated in the time period T9, the node F is stepped up to a voltage level 3 VDD by the capacitor C7. The level shifter 34-4 shifts a voltage level of the pulse signal P9 from the power voltage VDD to a high voltage level VPP. The NMOS transistor N8 is turned on so that charges of the node F are transferred to a high voltage generating terminal, whereby a high voltage VPP is stepped up.

The high voltage generating circuit of FIG. 7 can step up a high voltage level VPP to a desired voltage level by stepping up a voltage level of the node F to a voltage level 3 VDD. That is, the high voltage generating circuit of FIG. 7 can step up the high voltage higher than that of FIG. 3.

The high voltage generating circuits of FIGS. 5 and 7 can step up a high voltage to a desired level even though a power voltage level VDD is lowered. However, the high voltage generating circuits of FIGS. 5 and 7 cannot perform a step up operation faster than that of FIG. 3 because a step-up operation is performed through three steps per time period that the active command ACT having a logic "high" level is applied. That is, as shown in FIGS. 6 and 8, since the high voltage step-up operation is performed in the time period, the inventive high voltage generating circuit cannot perform a step-up operation faster than that of FIG. 3.

Figure 9:
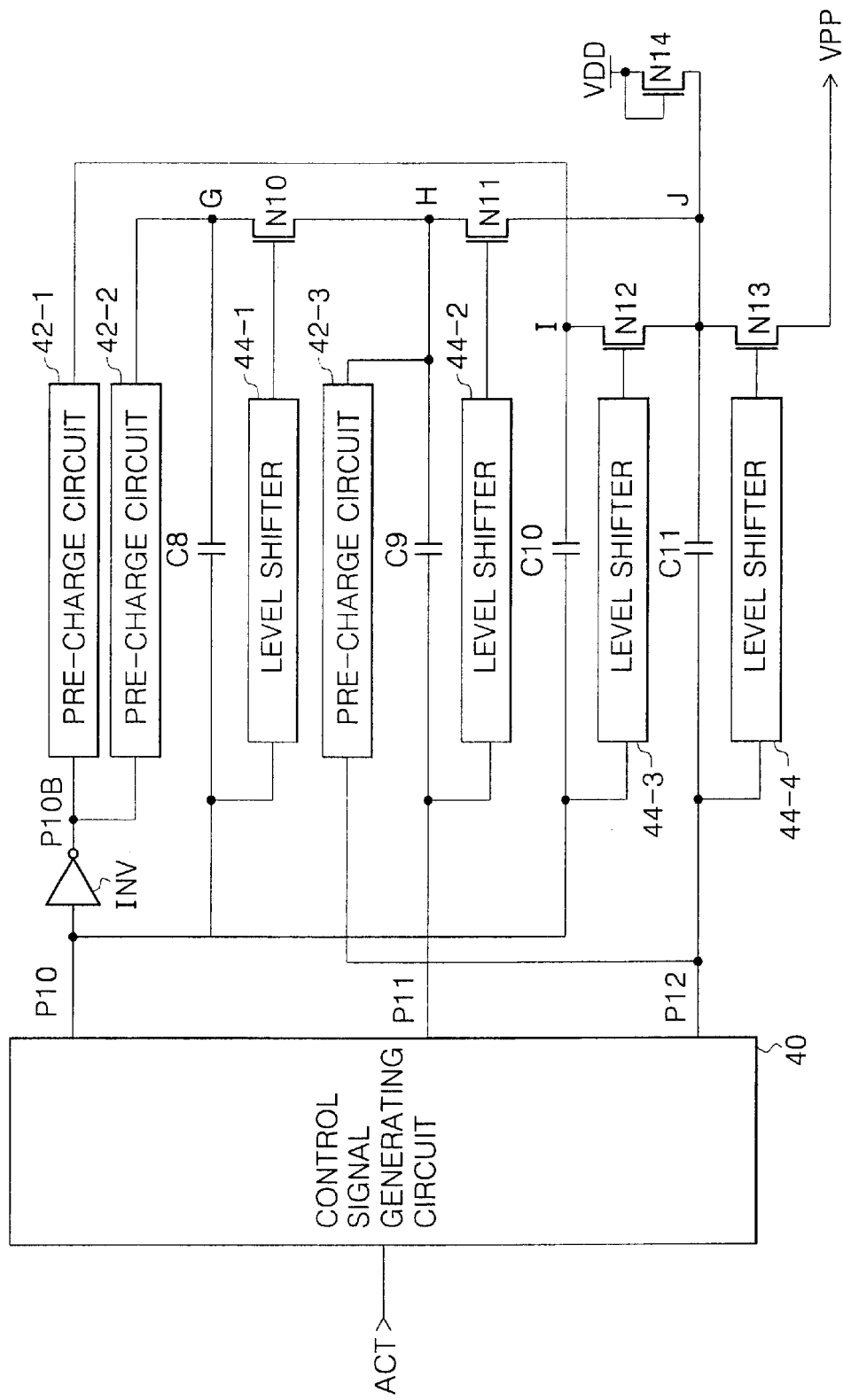
FIG. 9 is a circuit diagram illustrating a high voltage generating circuit according to another embodiment of the present invention.

FIG. 9 is a circuit diagram illustrating a high voltage generating circuit according to another embodiment of the present invention. The high voltage generating circuit includes a control signal generating circuit 40, an inverter INV, pre-charge circuits 42-1 to 42-3, capacitors C8 to C11, level shifters 44-1 to 44-4, and NMOS transistors N10 to N14.

The control signal generating circuit 40 generates a pulse signal P10 having a phase opposite to a phase of an active command ACT, and generates pulse signals P11 and P12 having a logic "high" level in different phase while the active command ACT having a logic "high" level is applied. The inverter INV inverts the pulse signal P10 to generate a pulse signal P10B. The pre-charge circuits 42-1 and 42-2 pre-charge nodes G and I in response to the pulse signal P10B, respectively. The pre-charge circuit 42-3 pre-charges a node H in response to the pulse signal P12. The NMOS transistor N14 pre-charges a node J to a voltage level VDD−VT at the initial stage, and supplies charges to the node J when a voltage level of the node J is lower than a power voltage level. The capacitor C8 steps up a node G in response to the pulse signals P10. The level shifter 44-1 shifts a voltage level of the pulse signal P10 from a voltage level VDD having a logic "high" level to a voltage level VPP. The NMOS transistor N10 is turned on in response to an output signal of the level shifter 44-1 to make a charge sharing operation be formed between the nodes G and H. The capacitor C9 steps up a node H in response to the pulse signal P11. The level shifter 44-2 shifts a voltage level of the pulse signal P11 from a voltage level VDD having a logic "high" level to a voltage level VPP. The NMOS transistor N11 is turned on in response to an output signal of the level shifter 44-2 to make a charge sharing operation be formed between the nodes H and J. The capacitor C10 steps up the node I in response to the pulse signal P10. The level shifter 44-3 shifts a voltage level of the pulse signal P10 from a voltage level VDD having a logic "high" level to a voltage level VPP. The NMOS transistor N12 is turned on in response to an output signal of the level shifter 44-3 to make a charge sharing operation be formed between the nodes I and J. The capacitor C11 steps up the node J in response to the pulse signal P12. The level shifter 44-4 shifts a voltage level of the pulse signal P12 from a voltage level VDD having a logic "high" level to a voltage level VPP. The NMOS transistor N13 is turned on in response to an output signal of the level shifter 44-4 to transfer the boosted voltage of the node J to a high voltage generating terminal.

Figure 10:
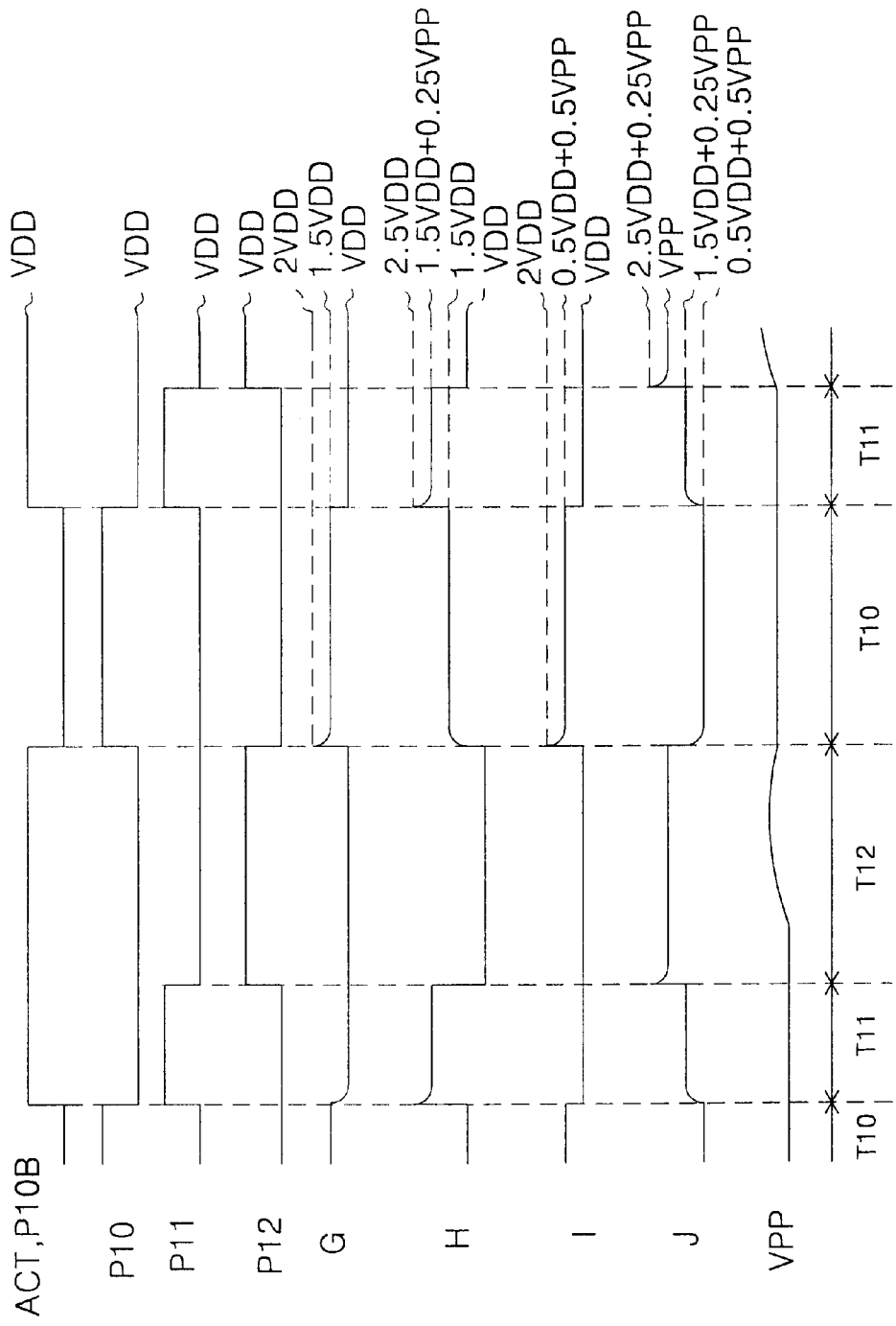
FIG. 10 is a timing diagram illustrating an operation of the high voltage generating circuit of FIG. 9.

Operation of the high voltage generating circuit of FIG. 9 is described with reference to a timing diagram of FIG. 10.

When the active command ACT is applied, the control signal generating circuit 40 generates the pulse signal P10 having a phase opposite to a phase of the active command ACT and the pulse signal P10B having the same phase as a phase of the active command ACT. Also, the pulse signal P11 having a power voltage level VDD is generated in a time period T11, and the pulse signal P12 having a power voltage level VDD having a power voltage level VDD is generated in a time period T12.

In the time period T10 after the operation is repeatedly performed by several times to tens of times, the capacitors C8 and C10 perform a step-up operation in response to the pulse signal P10 having a power voltage level to step up the nodes G and I to a voltage level 2 VDD. The level shifters 44-1 and 44-3 shift a voltage level of the pulse signal P10 from a power voltage level to a high voltage level. The NMOS transistors N10 and N12 are turned on in response to a signal having a high voltage level VPP to perform a charge sharing operation of the nodes G and H, and I and J. Therefore, the nodes G and H become a voltage level 1.5 VDD, and the nodes I and J become a voltage level 0.5 VDD+0.5 VPP.

In the time period T11, the capacitor C9 performs a step-up operation in response to the pulse signal P11 having a power voltage level VDD to step up the node H to a voltage level 2.5 VDD. The level shifter 44-2 shifts a voltage level of the pulse signal P11 from a power voltage level to a high voltage level. The NMOS transistor N11 is turned on in response to a signal having a high voltage level VPP to perform a charge sharing operation of the nodes H and J. Therefore, the nodes H and J become a voltage level 1.5 VDD+0.25 VPP.

In the time period T12, the capacitor C11 performs a step-up operation in response to the pulse signal P12 having a power voltage level VDD to step up the node J to a voltage level 2.5 VDD+0.25 VPP. The level shifter 44-4 shifts a voltage level of the pulse signal P12 from a power voltage level to a high voltage level. The NMOS transistor N13 is turned on in response to a signal having a high voltage level VPP to perform a charge sharing operation between the node J and a high voltage generating terminal. Therefore, the node J becomes a high voltage level VPP.

The high voltage VPP is generated by repeatedly performing the above-described operation.

The high voltage generating circuit of FIG. 9 can step up a high voltage level VPP to a desired voltage level even though a power voltage level VDD is lowered because it is possible to step up a voltage level of the node J, which is a voltage-boosting node, to a voltage level 2.5 VDD+0.25 VPP.

In addition, the high voltage generating circuit of FIG. 9 performs a step-up operation one time in the time period that the active command ACT having a logic "low" level is applied and two times in the time period T12 that the active command ACT having a logic "high" level is applied. Therefore, the voltage generating circuit of FIG. 9 performs a step-up operation total three times. Therefore, as shown in FIG. 10, the high voltage generating circuit of FIG. 9 performs a step-up operation two times in the time period that the active command is applied, and can perform a step-up operation faster than those of FIGS. 5 and 7 by setting the time period T11 to be longer than the time period T12.

As described above, even though a power voltage level is lowered, the inventive high voltage generating circuit and method can generate a high voltage having a desired voltage level. In addition, the inventive high voltage generating circuit and method can perform a high voltage step-up operation faster.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A high voltage generating circuit, comprising:
   a control signal generating circuit for generating a first control signal in a first time period, and for generating second, third and fourth control signals in second, third and fourth time periods;
   first, second and third pre-charge circuits for pre-charging first, second and third nodes in response to the first control signal;
   first and second step-up and charge transferring circuits for stepping up the first and third nodes in response to the second control signal, and for performing a charge sharing operation between the first and second nodes and between the third and a fourth node, respectively;
   a third step-up and charge transferring circuit for stepping up the second node in response to the third control signal and for performing a charge sharing operation between the second and fourth nodes;
   a pre-charge and charge supplying circuit for pre-charging the fourth node and for supplying charges to the fourth node; and
   a fourth step-up and charge transferring circuit for stepping up the fourth node in response to the fourth control signal, and for transferring charges of the fourth node to a high voltage generating terminal.

2. The circuit of claim 1, wherein the first step-up and charge transferring circuits comprises:
   a first capacitor for stepping up the first node in response to the second control signal;
   a first level shifter for shifting a level of the second control signal; and
   a first NMOS transistor structured to turn on in response to an output signal of the first level shifter to transfer charges between the first and second nodes.

3. The circuit of claim 1, wherein the second step-up and charge transferring circuit comprises:
   a second capacitor for stepping up the third node in response to the second control signal;
   a second level shifter for shifting a level of the second control signal; and a second NMOS transistor structured to turn on in response to an output signal of the second level shifter to transfer charges between the third and fourth nodes.

4. The circuit of claim 1, wherein the third step-up and charge transferring circuit comprises:
   a third capacitor for stepping up the second node in response to the third control signal;
   a third level shifter for shifting a level of the third control signal; and
   a third NMOS transistor structured to turn on in response to an output signal of the third level shifter to transfer charges between the second and fourth nodes.

5. The circuit of claim 1, wherein the fourth step-up and charge transferring circuit comprises:
   a fourth capacitor for stepping up the fourth node in response to the fourth control signal;
   a fourth level shifter for shifting a level of the fourth control signal; and
   a fourth NMOS transistor structured to turn on in response to an output signal of the fourth level shifter to transfer charges of the fourth node to the high voltage generating terminal.

6. The circuit of claim 1, wherein the pre-charge and charge supplying circuit comprises:
   a fifth NMOS transistor having a first electrode and a gate connected to a power voltage, and having a second electrode connected to the fourth node.

7. A high voltage generating circuit, comprising:
   a control signal generating circuit for generating a first control signal in a first time period, and for generating second, third and fourth control signals in second, third and fourth time periods;
   first, second, third, and fourth pre-charge circuits for pre-charging first, second, third, and fourth nodes in response to the first control signal;
   first and second step-up and charge transferring circuitsfor stepping up the first and third nodes in response to the second control signal, and for performing a charge sharing operation between the first and second nodes and between the third and, fourth nodes, respectively;
   a third step-up and charge transferring circuit for stepping up the second node in response to the third control signal and for performing a charge sharing operation between the second and fourth nodes; and
   a fourth step-up and charge transferring circuit for stepping up the fourth node in response to the fourth control signal and for transferring charges of the fourth node to a high voltage generating terminal.

8. The circuit of claim 7, wherein the first step-up and charge transferring circuit includes:
   a first capacitor for stepping up the first node in response to the second control signal;
   a first level shifter for shifting a level of the second control signal; and
   a first NMOS transistor structured to turn on in response to an output signal of the first level shifter to transfer charges between the first and second nodes.

9. The circuit of claim 7, wherein the second step-up and charge transferring circuit includes:
   a second capacitor for stepping up the third node in response to the second control signal;
   a second level shifter for shifting a level of the second control signal; and
   a second NMOS transistor structured to turn on in response to an output signal of the second level shifter to transfer charges between the third and fourth nodes.

10. The circuit of claim 7, wherein the third step-up and charge transferring circuit includes:
    a third capacitor for stepping up the second node in response to the third control signal;
    a third level shifter for shifting a level of the third control signal; and
    a third NMOS transistor structured to turn on in response to an output signal of the third level shifter to transfer charges between the second and fourth nodes.

11. The circuit of claim 7, wherein the fourth step-up and charge transferring circuit includes:
    a fourth capacitor for stepping up the fourth node in response to the fourth control signal;
    a fourth level shifter for shifting a level of the fourth control signal; and
    a fourth NMOS transistor structured to turn on in response to an output signal of the fourth level shifter to transfer charges of the fourth node to the high voltage generating terminal.

12. A high voltage generating circuit, comprising:
    a control signal generating circuit for generating a first control signal in a first time period, and for generating second and third control signals in second and third time periods;
    first and second step-up and charge transferring circuits for stepping up first and third nodes in response to the first control signal, and for performing a charge sharing operation between first and second nodes and between the third and fourth nodes respectively;
    a third step-up and charge transferring circuit for stepping up the second node in response to the second control signal and for performing a charge sharing operation between the second and fourth nodes;
    first and second pre-charge circuits for respectively pre-charging first and third nodes in response to an inverted signal of the first control signal;
    a third pre-charge circuit for pre-charging the second node in response to the third control signal;
    a pre-charge and charge supplying circuit for pre-charging the fourth node and for supplying charges to the fourth node; and
    a fourth step-up and charge transferring circuit for stepping up the fourth node in response to the third control signal and for transferring charges of the fourth node to a high voltage generating terminal.

13. The circuit of claim 12, wherein the first step-up and charge transferring circuit includes:
    a first capacitor for stepping up the first node in response to the first control signal;
    a first level shifter for shifting a level of the first control signal; and
    a first NMOS transistor structured to turn on in response to an output signal of the first level shifter to transfer charges between the first and second nodes.

14. The circuit of claim 12, wherein the second step-up and charge transferring circuit includes:
    a second capacitor for stepping up the third node in response to the first control signal;
    a second level shifter for shifting a level of the first control signal; and
    a second NMOS transistor structured to turn on in response to an output signal of the second level shifter to transfer charges between the third and fourth nodes.

15. The circuit of claim 12, wherein the third step-up and charge transferring circuit includes:
   a third capacitor for stepping up the second node in response to the second control signal;
   a third level shifter for shifting a level of the second control signal; and
   a third NMOS transistor structured to turn on in response to an output signal of the third level shifter to transfer charges between the second and fourth nodes.

16. The circuit of claim 12, wherein the fourth step-up and charge transferring circuit includes:
   a fourth capacitor for stepping up the fourth node in response to the third control signal;
   a fourth level shifter for shifting a level of the third control signal; and
   a fourth NMOS transistor structured to turn on in response to an output signal of the fourth level shifter to transfer charges of the fourth node to the high voltage generating terminal.

17. The circuit of claim 12, wherein the pre-charge and charge supplying circuit includes a fifth NMOS transistor having a first electrode and a gate connected to a power voltage and a second electrode connected to the fourth node.

18. A high voltage generating circuit, comprising:
   a control signal generating circuit for receiving an enable signal and generating a plurality of control signals;
   a plurality of step-up circuits for generating a voltage stepped up in response to at least two control signals among the plurality of the control signals; and
   a pre-charge circuit for pre-charging outputs of the plurality of the step-up circuits in response to at least one control signal among the plurality of the control signals,
   wherein outputs from at least two step-up circuits among the plurality of the step-up circuits are commonly connected to other step-up circuits.

19. The circuit of claim 18, further comprising, for each of the plurality of step-up circuits, a voltage transferring circuits for transferring the stepped-up voltage.

20. The circuit of claim 18, wherein the pre-charge circuit includes first and second pre-charge circuits coupled to at least a first and second of the plurality of step-up circuits step-up.

21. The circuit of claim 18, wherein at least one among the plurality of the step-up circuit is coupled to a voltage compensating circuit.

22. A high voltage generating circuit for a semiconductor memory device, comprising:
   a control signal generating circuit for receiving an enable signal and generating a pre-charge control signal and a plurality of step-up voltage control signals;
   a plurality of step-up circuits each for generating a stepped-up voltage from one of the plurality of step-up voltage control signals;
   a plurality of pre-charge circuits for pre-charging outputs of each of the plurality of the step-up circuits in response to the pre-charge control signal; and
   a step-up voltage control circuit for controlling the plurality of the step-up circuits that is responsive to at least one among the plurality of the step-up control signals;
   wherein outputs from at least two step-up circuits among the plurality of the step-up circuits are commonly connected to other step-up circuits.

23. The circuit of claim 22, wherein the step-up circuits includes a capacitor, a level shifter, and a voltage transferring circuit.

24. The circuit of claim 23, wherein the voltage transferring circuit includes input and output terminals, each of the input terminals connected to the pre-charge circuits.

25. The circuit of claim 22, wherein outputs from at least two step-up circuits are commonly connected to a voltage compensating circuit.

26. The circuit of claim 25, wherein the voltage compensating circuit includes a diode.

27. A method of generating a voltage at a high voltage terminal, comprising:
   pre-charging first, second, and third nodes in response a first control signal generated in a first time period;
   stepping up the first and third nodes in response to a second control signal generated in a second time period that an enable signal is generated, and performing a charge sharing operation between the first and second nodes and between the third and a fourth node;
   stepping up the second node in response to a third control signal generated in a third time period that the enable signal is generated, and performing a charge sharing operation between the second and fourth nodes; and
   stepping up the fourth node in response to a fourth control signal generated in a fourth time period that the enable signal is generated, and transferring charges of the fourth node to the high voltage terminal.

28. The method of claim 27, further comprising pre-charging the fourth node at the same time as the first, second and third nodes are pre-charged.

29. A method of generating a voltage at a high voltage terminal, comprising:
   stepping-up first and third nodes in response to a first control signal generated in a first time period, and performing a charge sharing operation between the first node and a second node and between the third node and a fourth node;
   stepping-up the second node in response to a second control signal generated in a second time period that an enable signal is generated, and performing a charge sharing operation between the second and fourth nodes;
   pre-charging the first and third nodes in response to an inverted signal of the first control signal;
   pre-charging the second nodes in response to a third control signal generated in a third time period that the enable signal is generated; and
   stepping up the fourth node in response to the third control signal, and transferring charges of the fourth node to the high voltage terminal.

* * * * *